(12) United States Patent
Tamaoki

(10) Patent No.: US 9,987,908 B2
(45) Date of Patent: Jun. 5, 2018

(54) VEHICLE SUN VISOR

(71) Applicant: TOYOTA JIDOSHA KABUSHIKI KAISHA, Toyota-shi, Aichi-ken (JP)

(72) Inventor: Akihiro Tamaoki, Tajimi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 57 days.

(21) Appl. No.: 15/053,148

(22) Filed: Feb. 25, 2016

(65) Prior Publication Data

US 2016/0263970 A1    Sep. 15, 2016

(30) Foreign Application Priority Data

Mar. 12, 2015 (JP) .................................. 2015-050031

(51) Int. Cl.
*B60J 3/02* (2006.01)
*B60R 11/00* (2006.01)

(52) U.S. Cl.
CPC ............ *B60J 3/0213* (2013.01); *B60N 2/879* (2018.02); *B60J 3/0204* (2013.01); *B60R 2011/0035* (2013.01)

(58) Field of Classification Search
None
See application file for complete search history.

(56) References Cited

U.S. PATENT DOCUMENTS

| 824,481 | A | * | 6/1906 | Heinerici | ................. | A47C 7/66 |
| | | | | | | 416/57 |
| 3,404,915 | A | * | 10/1968 | De Souza Filho | .... | A47C 1/146 |
| | | | | | | 297/17 |
| 3,922,034 | A | * | 11/1975 | Eggert | ................. | B60N 2/4805 |
| | | | | | | 2/10 |
| 4,583,780 | A | * | 4/1986 | Finn | ....................... | A47D 15/00 |
| | | | | | | 24/332 |

(Continued)

FOREIGN PATENT DOCUMENTS

| JP | S57-116723 U | 7/1982 |
| JP | H05-44142 U | 6/1993 |

(Continued)

OTHER PUBLICATIONS

Apr. 25, 2017 Office Action issued in Japanese Patent Application No. 2015-050031.

*Primary Examiner* — Joshua J Michener
*Assistant Examiner* — Kyle J. Walraed-Sullivan
(74) *Attorney, Agent, or Firm* — Oliff PLC

(57) ABSTRACT

A sun visor includes: a first light-blocking plate having a base attached to a seat width direction inside surface of a head rest of a front seat disposed in a vehicle via a fastener whose axial direction coincides with the seat width direction and selectively assuming a stored state in which the first light-blocking plate lies along the seat up and down direction about the fastener and a use state in which the first light-blocking plate lies along the seat front and rear direction about the fastener; a second light-blocking plate having (Continued)

a base end portion attached to a seat width direction outside surface of the head rest of the front seat via the fastener and selectively assuming the stored state and the use state; and a third light-blocking plate that interconnects in the seat width direction the first light-blocking plate and the second light-blocking plate.

3 Claims, 5 Drawing Sheets

(56) References Cited

U.S. PATENT DOCUMENTS

| | | | | |
|---|---|---|---|---|
| 4,784,433 | A | * 11/1988 | Purnell-Ayres | A47C 7/66 135/19.5 |
| 4,813,739 | A | * 3/1989 | Miller | A47C 7/66 297/184.12 |
| 4,883,315 | A | * 11/1989 | Ferguson | B60N 2/286 135/96 |
| 4,911,498 | A | * 3/1990 | Becher | A47C 7/66 297/184.12 |
| 5,096,257 | A | * 3/1992 | Clark | A47C 7/66 135/96 |
| 5,582,458 | A | * 12/1996 | Wildt | A47C 1/143 297/183.5 |
| 8,939,503 | B2 | * 1/2015 | Mori | B60N 2/4838 297/216.12 |
| 2005/0273218 | A1 | * 12/2005 | Breed | B60C 11/24 701/2 |
| 2010/0102604 | A1 | * 4/2010 | Barnes | B60N 2/2821 297/250.1 |
| 2010/0253041 | A1 | * 10/2010 | Schneider | A61G 5/1094 280/304.1 |
| 2012/0173069 | A1 | * 7/2012 | Tsimhoni | G01C 21/365 701/25 |
| 2013/0300176 | A1 | * 11/2013 | Gabriel | B60N 2/286 297/391 |
| 2015/0097483 | A1 | * 4/2015 | Huelke | B60Q 3/80 315/77 |

FOREIGN PATENT DOCUMENTS

| | | |
|---|---|---|
| JP | H10-67258 A | 3/1998 |
| JP | H10-119811 A | 5/1998 |
| JP | 3096932 U | 1/2004 |
| JP | 2009-214638 A | 9/2009 |

* cited by examiner

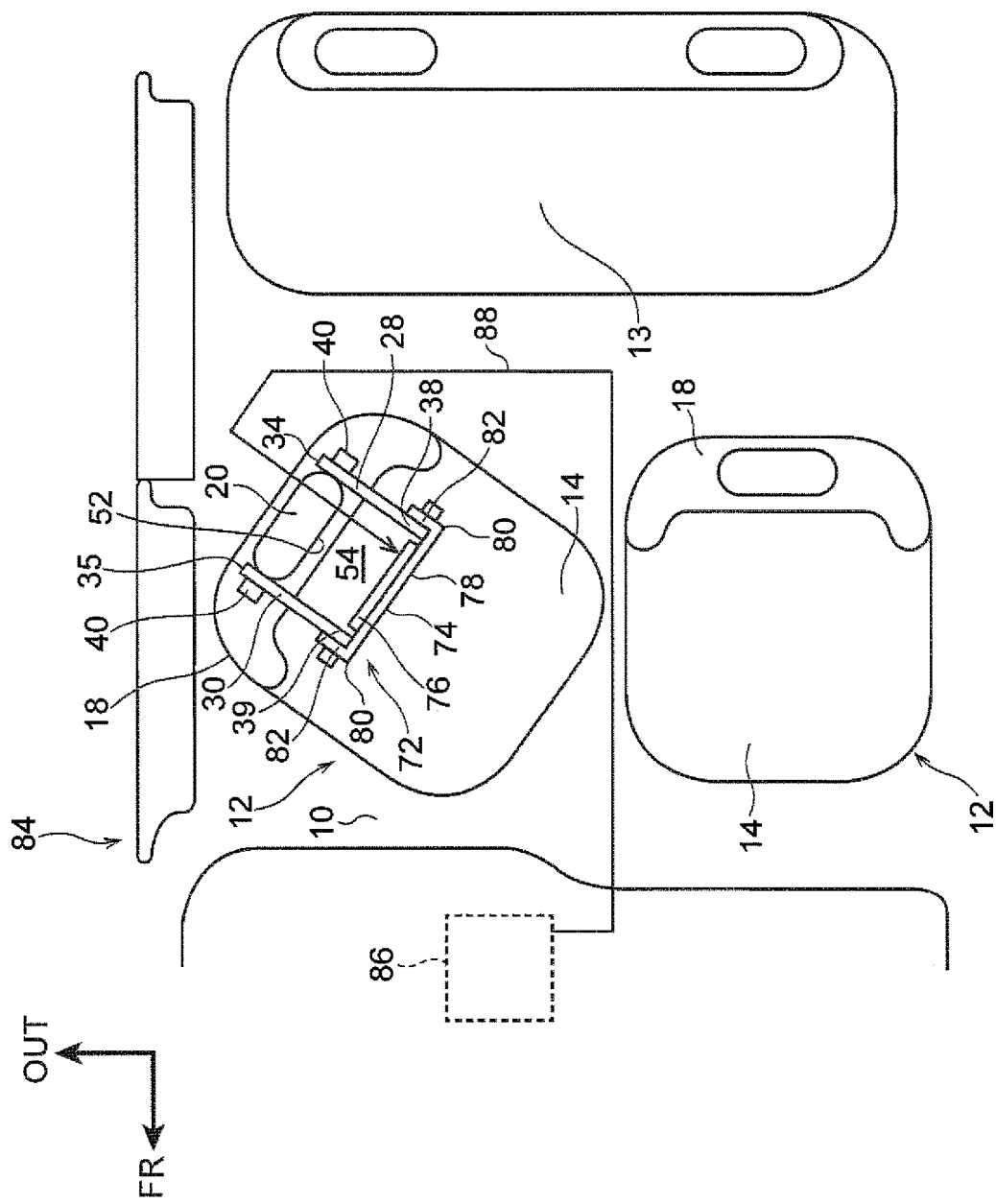

VEHICLE SUN VISOR

CROSS-REFERENCE TO RELATED APPLICATION

This application claims priority under 35 USC 119 from Japanese Patent Application No. 2015-050031 filed on Mar. 12, 2015, the disclosure of which is incorporated by reference herein.

BACKGROUND

Technical Field

The present invention relates to a vehicle sun visor.

Related Art

Japanese Patent Application Laid-open (JP-A) No. 2009-214638 discloses a sun visor structure. Specifically, the sun visor is configured by a light-blocking plate formed in a substantially rectangular plate shape as seen in a vehicle side view and having a base end portion inclined inward in the vehicle width direction. The light-blocking plate is attached to a vehicle width direction outside surface of a head rest disposed on the vehicle upper side of a vehicle seat via a shaft portion that is disposed in the base end portion and whose axial direction coincides with the substantially vehicle width direction. Consequently, when using the sun visor, one rotates the light-blocking plate about the shaft portion so that a lengthwise direction distal end portion of the light-blocking plate is positioned on the vehicle front side, so the light-blocking plate is placed on the vehicle width direction outer side of a head of an occupant seated in the vehicle seat—that is, on one side of the occupant. Because of this, light striking the head of the occupant facing the vehicle forward direction from a side window on the side where the sun visor is disposed is blocked. Furthermore, when not using the sun visor, one rotates the distal end portion of the light-blocking plate toward the vehicle rear side, so the light-blocking plate is stored in a position along a vehicle rear side surface of the head rest. Because of this, when the sun visor is not used, the light-blocking plate does not get in the way and does not lower the quality of how the vehicle seat looks from the outside.

In this connection, when the angle of the seat back of the vehicle seat is changed by reclining the seat back, for example, the position of the head of the seated occupant also changes. For this reason, the position of the light whose glare is felt by the occupant also changes, and depending on the position of the head of the occupant there is the potential for the aforementioned sun visor disposed on the vehicle width direction outer side of the head rest and for typical sun visors disposed on the upper side of the front window glass in the cabin to be unable to sufficiently block the light striking the occupant. Particularly when a self-driving vehicle is driving itself, it is also possible for the occupant seated in the vehicle seat to change the orientation of the vehicle seat while the vehicle is traveling, so that the vehicle seat faces inward in the vehicle width direction or faces the vehicle rearward direction. For this reason, there are cases where the head (eyes) is positioned in a position outside the range in which the light can be blocked by the sun visor that blocks light on the assumption that the occupant faces the vehicle forward direction. In this case, there is the potential for the blocking of light with respect to the occupant to be insufficient. Consequently, the prior art described above has room for improvement.

SUMMARY

In consideration of the problem described above, it is an object of the present invention to obtain a vehicle sun visor that can improve the comfort of an occupant with respect to sunlight regardless of the position of the vehicle seat.

A vehicle sun visor pertaining to a first aspect of the present invention includes: a first light-blocking plate that is configured by a material having a light-blocking property, is formed in a plate shape, has a base end portion attached to a vehicle inside surface of a head rest of a vehicle seat via a first shaft whose axial direction coincides with the seat width direction, and selectively assumes a stored state in which the first light-blocking plate is positioned in such a way that its lengthwise direction lies along the seat up and down direction about the first shaft and a use state in which the first light-blocking plate is positioned in such a way that its lengthwise direction lies along the seat front and rear direction about the first shaft; a second light-blocking plate that is configured by a material having a light-blocking property, is formed in a plate shape, has a base end portion attached to a vehicle outside surface of the head rest of the vehicle seat via the first shaft, and selectively assumes the stored state and the use state; and a third light-blocking plate that is configured by a material having a light-blocking property, is formed in a plate shape, and interconnects a distal end portion of the first light-blocking plate and a distal end portion of the second light-blocking plate.

A vehicle sun visor pertaining to a second aspect of the present invention is the vehicle sun visor of the first aspect, wherein the first light-blocking plate, the second light-blocking plate, and the third light-blocking plate are disposed in a self-driving vehicle in which the position of the vehicle seat can be changed while the self-driving vehicle is driving itself.

A vehicle sun visor pertaining to a third aspect of the present invention is the vehicle sun visor of the first aspect or the second aspect, wherein the third light-blocking plate is rotatably attached to the first light-blocking plate and the second light-blocking plate via a second shaft whose axial direction coincides with the seat width direction.

A vehicle sun visor pertaining to a fourth aspect of the present invention is the vehicle sun visor of any one of the first aspect to the third aspect, wherein the first light-blocking plate, the second light-blocking plate, and the third light-blocking plate are movable in the substantially seat up and down direction relative to the head rest.

A vehicle sun visor pertaining to a fifth aspect of the present invention is the vehicle sun visor of any one of the first aspect to the fourth aspect, wherein an information display unit capable of displaying predetermined information is disposed on or in the third light-blocking plate.

According to the first aspect, when the first light-blocking plate and the second light-blocking plate are placed in the stored state, the third light-blocking plate that interconnects the distal end portion of the first light-blocking plate and the distal end portion of the second light-blocking plate is placed on the seat upper side of the head rest. That is to say, in the stored state the first light-blocking plate, the second light-blocking plate, and the third light-blocking plate can be placed in a position in which they do not get in the way of the occupant seated in the vehicle seat. Furthermore, when the first light-blocking plate and the second light-blocking plate are placed in the use state, the third light-blocking plate is placed in a position substantially opposing a front surface of the head rest. That is, a space surrounded by the first light-blocking plate, the second light-blocking plate, and the third light-blocking plate is formed on the seat front side of the head rest. Additionally, in the use state of the sun visor the head of the occupant is placed in this space. Consequently, because the head of the occupant seated in the vehicle seat is positioned on the seat front side of the head rest, the seat front side and both seat width direction sides of the head are covered by the first light-blocking plate, the second light-blocking plate, and the third light-blocking plate that have a light-blocking property. For this reason, the light striking the occupant can be blocked in a wide range. Furthermore, because the base end portions of the first light-blocking plate and the second light-blocking plate are attached to the head rest, when the orientation of the vehicle seat is changed the positions of the first light-blocking plate, the second light-blocking plate, and the third light-blocking plate also concomitantly change. Consequently, even when the position of the vehicle seat is changed as a result of the vehicle seat being reclined or the vehicle seat being slid in the vehicle front and rear direction, the seat front side and both seat width direction sides of the head of the occupant can be concomitantly covered. That is to say, even when the vehicle seat is changed to various positions, the light striking the occupant can be blocked.

According to the second aspect, in the case of a self-driving vehicle, it is not necessary for the vehicle seat to face the vehicle forward direction while the self-driving vehicle is driving itself, so it is conceivable for the vehicle seat to face inward in the vehicle width direction so as to oppose another vehicle seat adjacent thereto or for the vehicle seat to face the vehicle rearward direction so as to oppose a rear seat. In this case, the first light-blocking plate, the second light-blocking plate, and the third light-blocking plate follow the change in the orientation of the vehicle seat, so the seat front side and both seat width direction sides of the head of the occupant seated in the vehicle seat facing a direction other than the vehicle forward direction can be covered. Consequently, light can be blocked even when the occupant faces various directions.

According to the third aspect, the third light-blocking plate is attached via the second shaft to the first light-blocking plate and the second light-blocking plate, so in the use state a field of view in front of the occupant can be ensured by rotating the third light-blocking plate so that it is substantially horizontal.

According to the fourth aspect, the first light-blocking plate and the second light-blocking plate are movable in the substantially seat up and down direction relative to the head rest, so the third light-blocking plate that interconnects the first light-blocking plate and the second light-blocking plate is also likewise movable in the substantially seat up and down direction. That is to say, the space surrounded by the first light-blocking plate, the second light-blocking plate, and the third light-blocking plate can be moved in the substantially seat up and down direction. Consequently, the position of the first light-blocking plate, the second light-blocking plate, and the third light-blocking plate can be adjusted in accordance with the position of the eyes of the occupant and the position struck by light.

According to the fifth aspect, the information display unit is disposed on or in the third light-blocking plate that opposes the head rest when the first light-blocking plate and the second light-blocking plate are placed in the use state, so information can be displayed to the occupant seated in the vehicle seat. That is to say, the occupant can check information displayed on the information display unit while the first light-blocking plate, the second light-blocking plate, and the third light-blocking plate are in the use state.

The vehicle sun visor pertaining to the first aspect has the superior effect that it can improve the comfort of the occupant with respect to sunlight regardless of the position of the vehicle seat.

The vehicle sun visor pertaining to the second aspect has the superior effect that it can improve the comfort of the occupant with respect to sunlight while the self-driving vehicle is driving itself.

The vehicle sun visor pertaining to the third aspect has the superior effect that it can easily ensure a field of view in cases where it is necessary.

The vehicle sun visor pertaining to the fourth aspect has the superior effect that it can further improve the comfort of the occupant with respect to sunlight regardless of the position of the vehicle seat.

The vehicle sun visor pertaining to the fifth aspect has the superior effect that it can improve the user-friendliness of the vehicle sun visor.

BRIEF DESCRIPTION OF THE DRAWINGS

FIG. 5 is a plan view showing a cabin of a vehicle equipped with a vehicle sun visor pertaining to a third embodiment.

DETAILED DESCRIPTION

First Embodiment

A first embodiment of a vehicle sun visor pertaining to the present invention will be described below using FIG. 1 and FIG. 2. It should be noted that arrow FR shown in these drawings indicates a forward direction in a vehicle front and rear direction, arrow OUT indicates an outward direction in a vehicle width direction, and arrow UP indicates an upward direction in a vehicle up and down direction.

Figure 1:
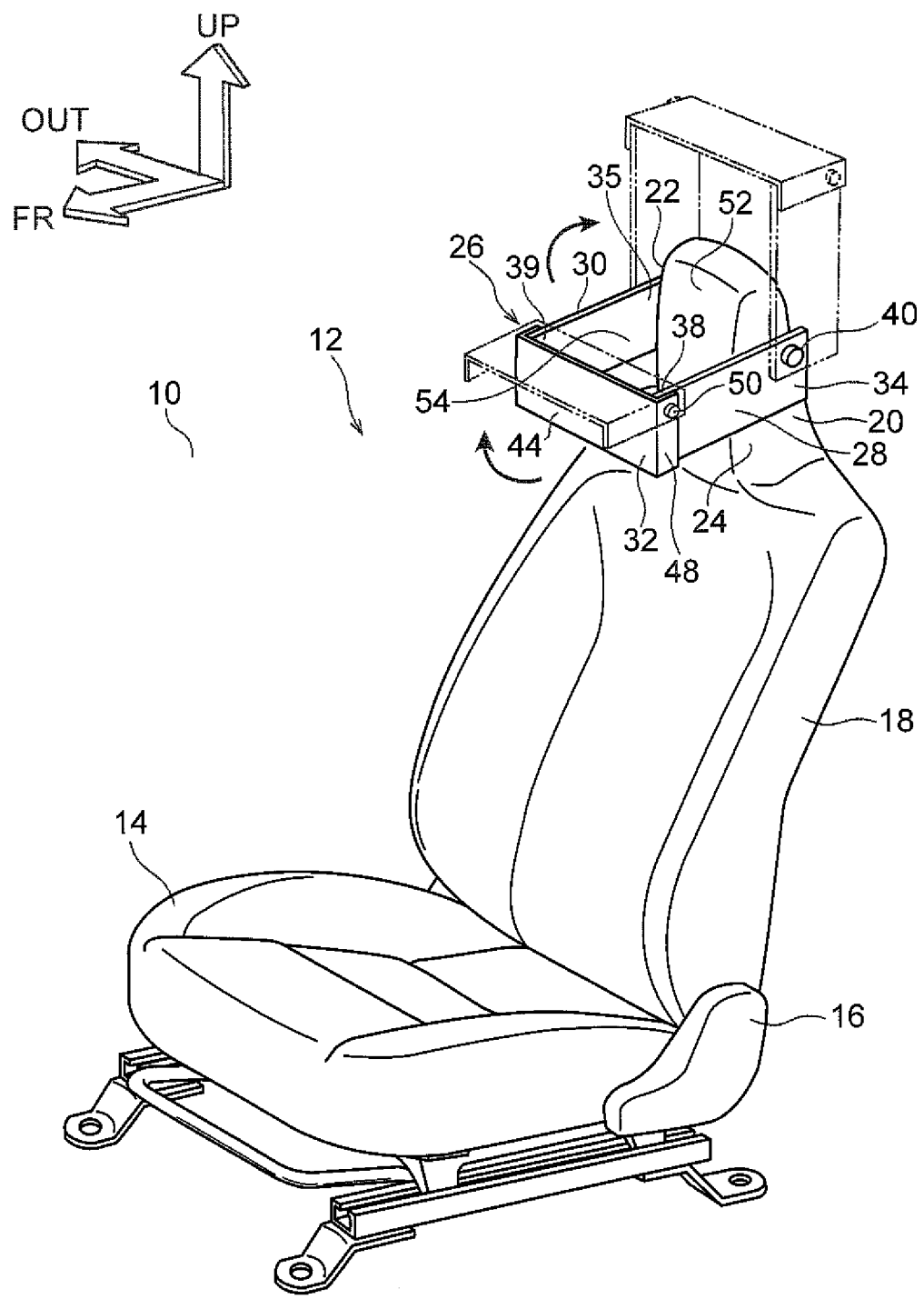
FIG. 1 is a perspective view showing a vehicle seat equipped with a vehicle sun visor pertaining to a first embodiment.
Figure 2:
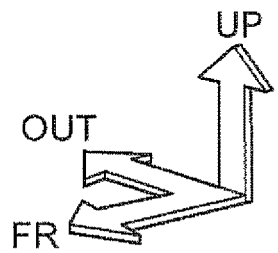
FIG. 2 is an enlarged perspective view showing the vehicle sun visor pertaining to the first embodiment.
Figure 2:
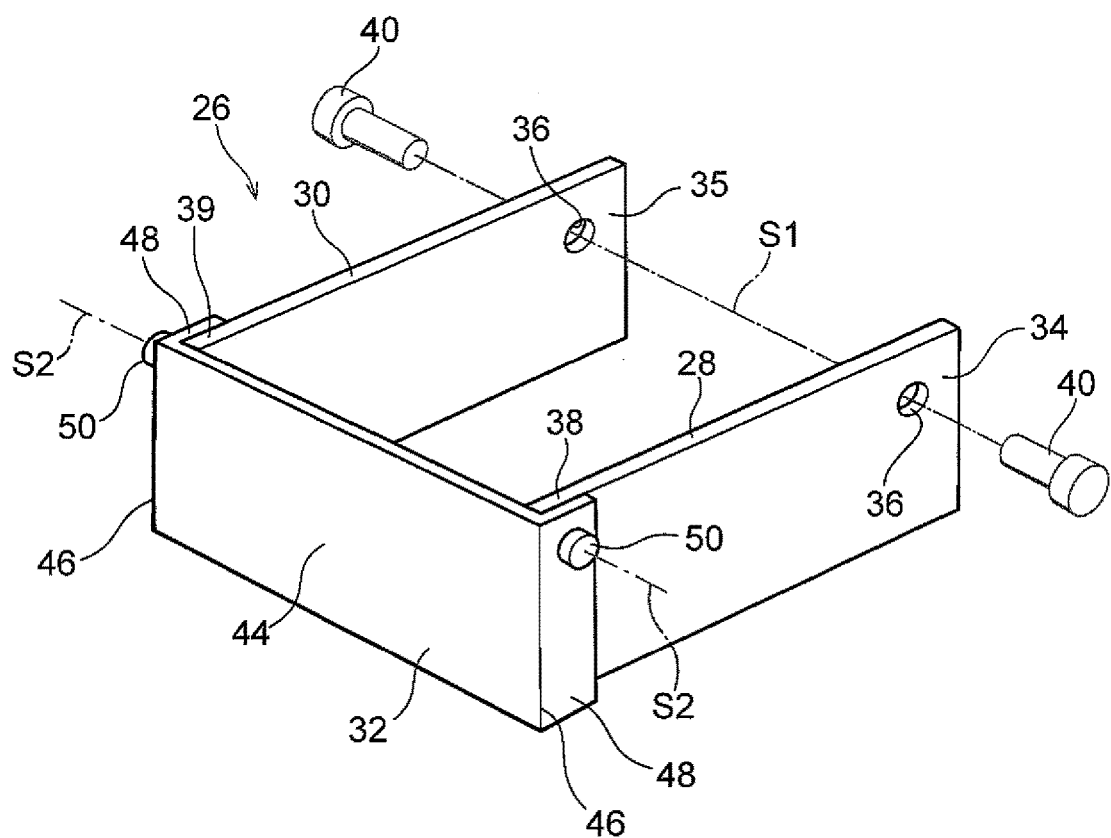

As shown in FIG. 1, a front seat 12 serving as a vehicle seat is disposed on the vehicle front side of a cabin 10. The front seat 12 has a seat cushion 14 on which an occupant sits and a seat back 18 that is attached via a reclining mechanism 16 to the rear end portion of the seat cushion 14. Furthermore, a head rest 20 is disposed on the vehicle upper side of the seat back 18. The head rest 20 is formed integrally with the seat back 18. It should be noted that although in the present embodiment the head rest 20 is formed integrally with the seat back 18, the head rest 20 is not limited to this and may also be separately configured.

A sun visor 26 serving as a vehicle sun visor is attached to the head rest 20. As shown in FIG. 2, the sun visor 26 is configured to include a first light-blocking plate 28, a second light-blocking plate 30, and a third light-blocking plate 32. The first light-blocking plate 28 is formed in a rectangular plate shape whose lengthwise direction coincides with the seat front and rear direction as seen in a seat side view and is configured by a material having a light-blocking property. It should be noted that the material having a light-blocking property is not limited to an opaque material through which light does not pass and may also be a translucent material that blocks light. In the present embodiment, the first light-blocking plate 28 is configured by an opaque material for example. Furthermore, a through hole 36 running in the plate thickness direction is formed in the seat up and down direction upper side of a base end portion 34 of the first light-blocking plate 28 in a position corresponding to a first shaft S1 whose axial direction coincides with the vehicle width direction. Similarly, a non-illustrated engagement hole is formed in the seat up and down direction upper side of a distal end portion 38 of the first light-blocking plate 28 in a position corresponding to a second shaft S2 whose axial direction coincides with the seat width direction. It should be noted that the first light-blocking plate 28 does not have to be completely rectangular.

A fastener 40 is inserted from inward in the seat width direction along the first shaft S1 through the through hole 36 formed in the base end portion 34 of the first light-blocking plate 28. The first light-blocking plate 28 is attached via the fastener 40 to an inside surface 24 on the seat width direction inside of the head rest 20 (see FIG. 1). The first light-blocking plate 28 is rotatable in the seat up and down direction about the fastener 40 and therefore about the first shaft S1.

The second light-blocking plate 30, which has the same configuration as the first light-blocking plate 28, is disposed in a position on the seat width direction outer side of and opposing the first light-blocking plate 28. As shown in FIG. 1, the first light-blocking plate 28 and the second light-blocking plate 30 are spaced apart from each other in the seat width direction so that they have substantially the same dimension in the seat width direction as the head rest 20 of the front seat 12. Additionally, like the first light-blocking plate 28, the second light-blocking plate 30 is rotatable in the seat up and down direction about the first shaft S1 because of a fastener 40 disposed in a base end portion 35 of the second light-blocking plate 30. Because of this, the first light-blocking plate 28 and the second light-blocking plate 30 are interconnected in the seat width direction at their distal end portions 38 and 39 by the third light-blocking plate 32 described later, so the first light-blocking plate 28 and the second light-blocking plate 30 are integrally rotatable in the seat up and down direction. It should be noted that a state in which the first light-blocking plate 28 and the second light-blocking plate 30 are positioned in such a way that their lengthwise direction lies along the substantially seat front and rear direction about the fasteners 40 corresponds to the "use state" of claim 1. Furthermore, a state in which the first light-blocking plate 28 and the second light-blocking plate 30 are positioned in such a way that their lengthwise direction lies along the substantially seat up and down direction about the fasteners 40 corresponds to the "stored state" of claim 1.

The third light-blocking plate 32 is attached to the distal end portion 38 of the first light-blocking plate 28 and the distal end portion 39 of the second light-blocking plate 30. The third light-blocking plate 32 is configured by a translucent material that blocks light, such as colored acrylic or polycarbonate for example, and is configured to include a front side light-blocking wall portion 44 formed in a substantially rectangular plate shape whose lengthwise direction coincides with the seat width direction and folded-back portions 48 disposed extending toward the seat rear side from both seat width direction end portions 46 of the front side light-blocking wall portion 44 (see FIG. 2). That is to say, the third light-blocking plate 32 is formed in a substantially U-shape as seen in a seat plan view. It should be noted that the third light-blocking plate 32 does not have to be completely rectangular.

Non-illustrated through holes running in the plate thickness direction are formed in the seat upper sides of the folded-back portions 48 of the third light-blocking plate 48 in positions corresponding to the second shaft S2 whose axial direction coincides with the seat width direction. Fasteners 50 are inserted through the through holes and attached to the first light-blocking plate 28 and the second light-blocking plate 30. Consequently, the third light-blocking plate 32 is rotatable in the seat up and down direction about the fasteners 50 (see the dashed lines in FIG. 1).

(Action and Effects of First Embodiment)

Next, the action and effects of the present embodiment will be described.

Here, the action and effects of the present embodiment will be described using a contrasting example shown in FIG. 3. It should be noted that constituent parts that are the same as those in the present embodiment are assigned the same numbers and description of those same constituent parts will be omitted.

Figure 3:
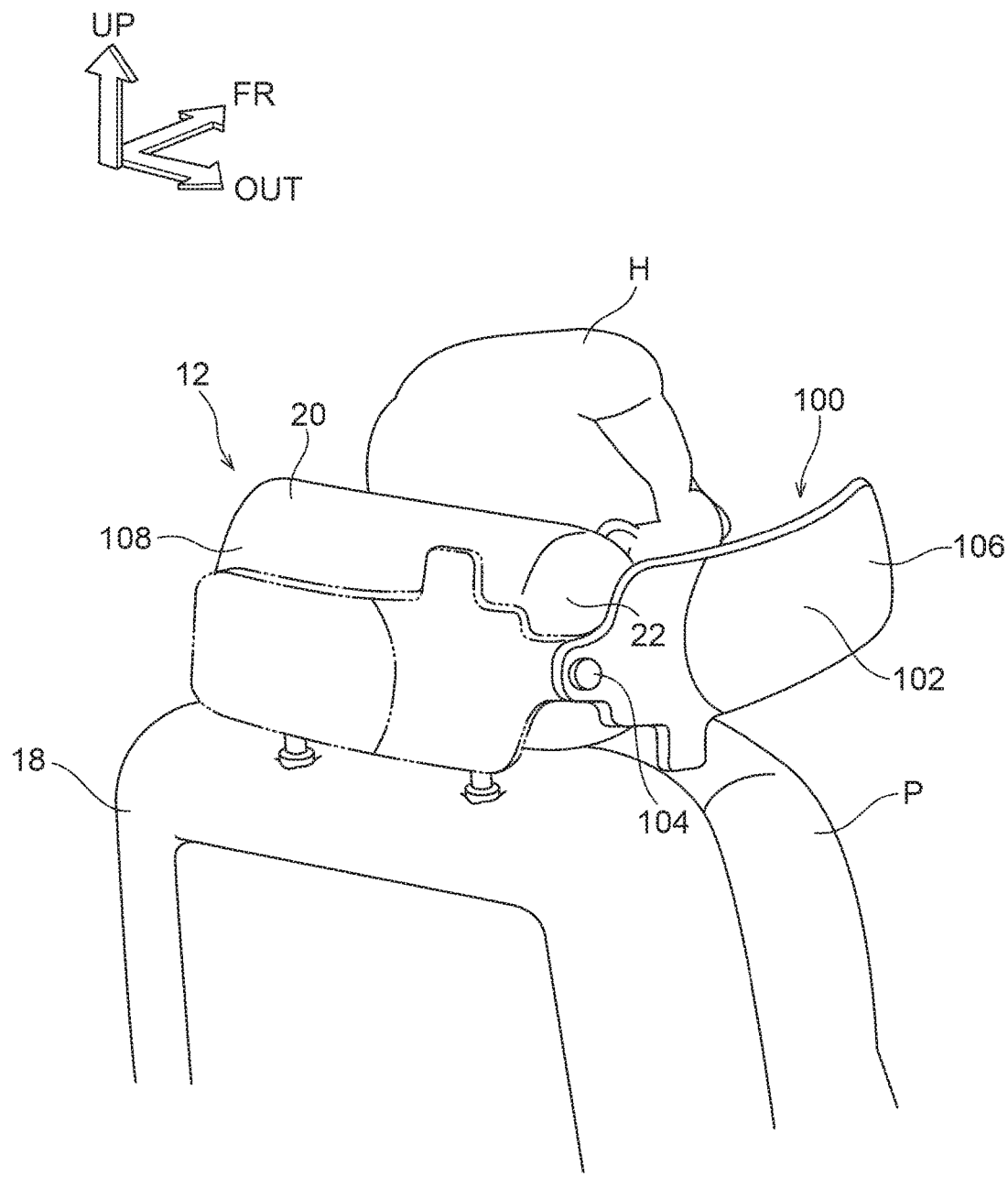
FIG. 3 is a perspective view showing a vehicle sun visor pertaining to a contrasting example as seen looking from the vehicle rear side toward the vehicle front side.

As shown in FIG. 3, a sun visor 100 is disposed on a seat width direction outside surface 22 of the head rest 20 of the front seat 12. The sun visor 100 has a light-blocking plate 102, which is formed in a substantially rectangular shape as seen in a seat side view and has a lengthwise direction base end portion inclined inward in the seat width direction, and a shaft portion 104, which is disposed in the base end portion and whose axial direction coincides with the substantially seat width direction. The light-blocking plate 102 is rotatably attached via the shaft portion 104 to the outside surface 22 of the head rest 20. Consequently, when using the sun visor 100, one rotates the light-blocking plate 102 about the shaft portion 104 so that a distal end portion 106 of the light-blocking plate 102 is placed on the seat front side, so the light-blocking plate 102 is placed on the seat width direction outer side of a head H of an occupant P seated in the front seat 12—that is, on one side of the occupant P. Because of this, light striking the head H of the occupant P facing the vehicle forward direction from a non-illustrated side window on the side where the sun visor 100 is disposed is blocked. Furthermore, when not using the sun visor 100, one rotates the distal end portion 106 of the light-blocking plate 102 toward the seat rear side, so the light-blocking plate 102 is stored in a position along a seat rear side surface 108 of the head rest 20 (see the dashed lines in FIG. 3). Because of this, the light-blocking plate 102 does not get in the way when the sun visor 100 is not used, and the light-blocking plate 102 does not lower the quality of how the front seat 12 looks from the outside.

In this connection, when the angle of the seat back 18 of the front seat 12 is changed by reclining the seat back 18, for example, the position of the head H of the seated occupant P also changes. For this reason, the position of the sunlight whose glare is felt by the occupant P also changes, and depending on the position of the head H of the occupant P there is the potential for the sun visor 100 disposed on the vehicle width direction outer side of the head rest 20 and for typical sun visors disposed on the upper side of the front window glass in the cabin to be unable to sufficiently block the light striking the occupant P. Particularly when a self-driving vehicle is driving itself, it is also possible for the occupant P seated in the front seat 12 to change the orientation of the front seat 12 while the vehicle is traveling, so that the front seat 12 faces inward in the vehicle width direction or faces the vehicle rearward direction. For this reason, there are cases where the head H is positioned in a position outside the range in which the light can be blocked by the sun visor 100 that blocks light on the assumption that the occupant P is facing the vehicle forward direction. In this case, there is the potential for the blocking of light with respect to the occupant P to be insufficient.

In contrast to this, in the present embodiment, as shown in FIG. 1, when the first light-blocking plate 28 and the second light-blocking plate 30 are placed in the stored state, the third light-blocking plate 32 that interconnects in the seat width direction the distal end portion 38 of the first light-blocking plate 28 and the distal end portion 39 of the second light-blocking plate 30 is placed on the seat upper side of the head rest 20. That is to say, in the stored state the first light-blocking plate 28, the second light-blocking plate 30, and the third light-blocking plate 32 can be placed in a position in which they do not get in the way of the occupant seated in the front seat 12. Furthermore, when the first light-blocking plate 28 and the second light-blocking plate 30 are placed in the use state, the third light-blocking plate 32 is placed in a position substantially opposing a front surface 52 of the head rest 20. That is, a space 54 surrounded by the first light-blocking plate 28, the second light-blocking plate 30, and the third light-blocking plate 32 is formed on the seat front side of the head rest 20. Additionally, in the use state of the sun visor 26 the head of the occupant is placed in this space 54. Consequently, because the head of the occupant seated in the front seat 12 is positioned on the seat front side of the head rest 20, the seat front side and both seat width direction sides of the head are covered by the first light-blocking plate 28, the second light-blocking plate 30, and the third light-blocking plate 32 that have a light-blocking property. For this reason, the light striking the occupant can be blocked in a wide range. Furthermore, because the base end portions 34 and 35 of the first light-blocking plate 28 and the second light-blocking plate 30 are attached to the head rest 20, when the orientation of the front seat 12 is changed the positions of the first light-blocking plate 28, the second light-blocking plate 30, and the third light-blocking plate 32 also concomitantly change. Consequently, even when the position of the front seat 12 is changed as a result of the front seat 12 being reclined or the front seat 12 being slid in the vehicle front and rear direction, the seat front side and both seat width direction sides of the head of the occupant can be concomitantly covered. That is to say, even when the front seat 12 is changed to various positions, the light striking the occupant can be blocked. Because of this, the comfort of the occupant with respect to sunlight can be improved regardless of the position of the front seat 12.

Furthermore, in the case of a self-driving vehicle, it is not necessary for the front seat 12 to face the vehicle forward direction while the self-driving vehicle is driving itself, so it is conceivable for the front seat 12 to face inward in the vehicle width direction so as to oppose another front seat 12 adjacent thereto or for the front seat 12 to face the vehicle rearward direction so as to oppose a rear seat 13 (see FIG. 5). In this case, the first light-blocking plate 28, the second light-blocking plate 30, and the third light-blocking plate 32 follow the change in the orientation of the front seat 12, so the seat front side and both seat width direction sides of the head of the occupant seated in the front seat 12 facing a direction other than the vehicle forward direction can be covered. Consequently, light can be blocked even when the occupant faces various directions. Because of this, the comfort of the occupant with respect to sunlight while the self-driving vehicle is driving itself can be improved.

Moreover, the third light-blocking plate 32 is attached via the second shaft S2 to the first light-blocking plate 28 and the second light-blocking plate 30, so in the use state a field of view in front of the occupant can be ensured by rotating the third light-blocking plate 32 so that it is substantially horizontal. Because of this, a field of view can be easily ensured in cases where it is necessary.

Second Embodiment

Next, a second embodiment of the vehicle sun visor pertaining to the present invention will be described using FIG. 4. It should be noted that constituent parts that are the same as those in the first embodiment are assigned the same numbers and description of those same constituent parts will be omitted.

The vehicle sun visor pertaining to the second embodiment has the same basic configuration as that of the first embodiment but is characterized in that a first light-blocking plate 58 and a second light-blocking plate 66 of a sun visor 56 serving as the vehicle sun visor are movable in the substantially seat up and down direction relative to the head rest 20.

Figure 4:
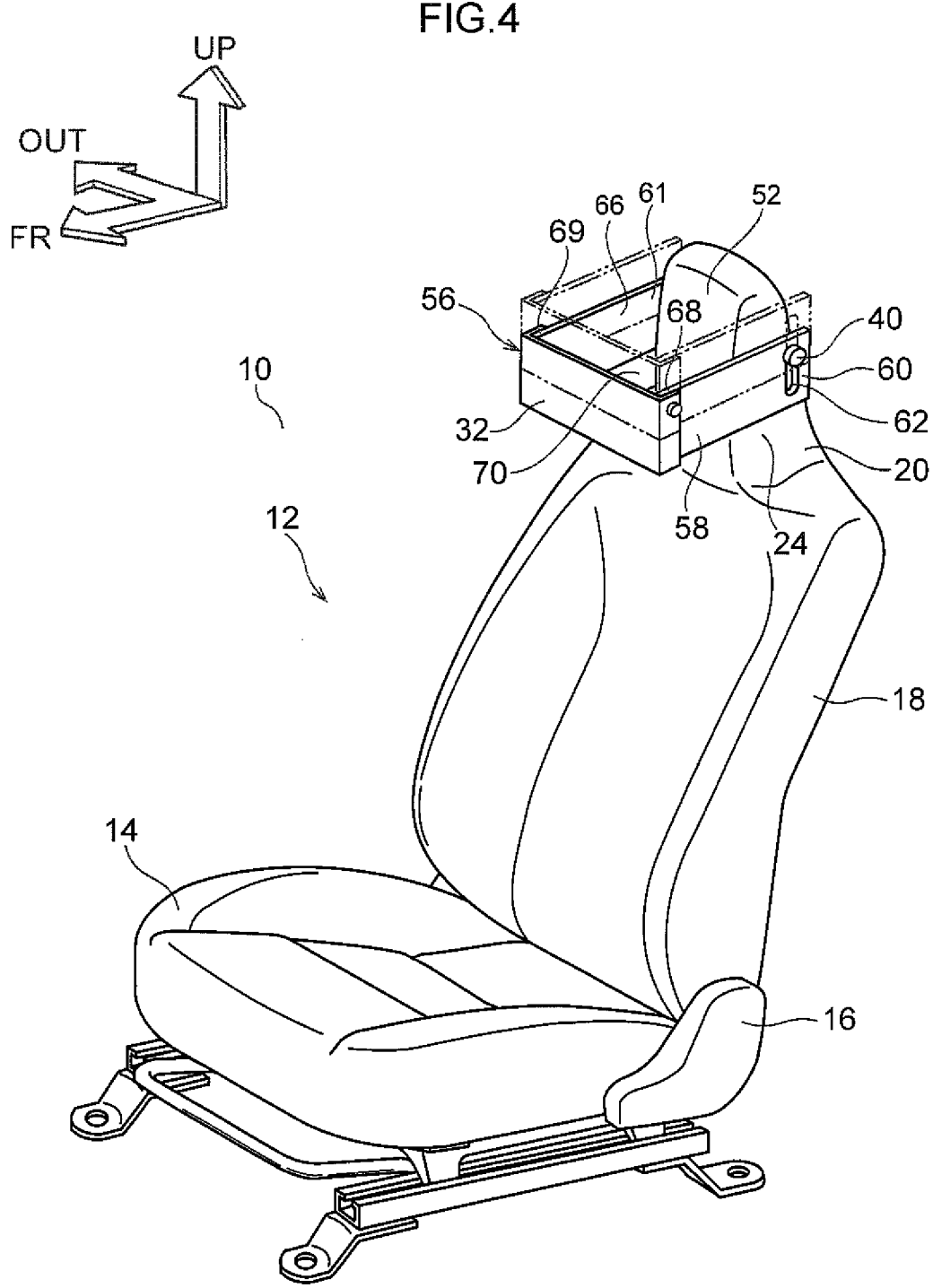
FIG. 4 is a perspective view showing a vehicle seat equipped with a vehicle sun visor pertaining to a second embodiment.

That is, as shown in FIG. 4, the first light-blocking plate 58 is formed in a substantially rectangular plate shape whose lengthwise direction coincides with the seat front and rear direction as seen in a seat side view and is configured by an opaque material through which light does not pass. Furthermore, a through hole 62 running in the plate thickness direction is formed in a base end portion 60 of the first light-blocking plate 58. The through hole 62 is formed in a long hole shape whose lengthwise direction coincides with the substantially seat up and down direction as seen in a seat side view.

The fastener 40 is inserted from inward in the seat width direction along the first shaft S1 (see FIG. 2) through the through hole 62 formed in the base end portion 60 of the first light-blocking plate 58. The first light-blocking plate 58 is attached via the fastener 40 to the inside surface 24 of the head rest 20. Furthermore, the first light-blocking plate 58 is movable in the substantially seat up and down direction about the fastener 40 and therefore about the first shaft S1. Moreover, because the through hole 62 is formed in a long hole shape whose lengthwise direction coincides with the substantially seat up and down direction, the first light-blocking plate 58 can be moved in the substantially seat up and down direction (see the dashed lines in FIG. 4).

The second light-blocking plate 66, which has the same configuration as the first light-blocking plate 58, is disposed in a position on the seat width direction outer side of and opposing the first light-blocking plate 58. The first light-blocking plate 58 and the second light-blocking plate 66 are spaced apart from each other in the seat width direction so that they have substantially the same dimension in the seat width direction as that of the head rest 20 of the front seat 12. Additionally, like the first light-blocking plate 58, the second light-blocking plate 66 is rotatable and movable in the substantially seat up and down direction about the first shaft S1 because of the fastener 40 disposed in a base end portion 61 of the second light-blocking plate 66. Furthermore, the third light-blocking plate 32 is attached to a distal end portion 68 of the first light-blocking plate 58 and a distal end portion 69 of the second light-blocking plate 66. Because of this, the first light-blocking plate 58 and the second light-blocking plate 66 are interconnected in the seat width direction at their distal end portions 68 and 69 by the third light-blocking plate 32, so the first light-blocking plate 58 and the second light-blocking plate 66 are integrally rotatable and movable in the substantially seat up and down direction.

(Action and Effects of Second Embodiment)

Next, the action and effects of the present embodiment will be described.

In the present embodiment, like in the first embodiment, as shown in FIG. 4, when the first light-blocking plate 58 and the second light-blocking plate 66 are placed in the stored state, the third light-blocking plate 32 that interconnects in the seat width direction the distal end portion 68 of the first light-blocking plate 58 and the distal end portion 69 of the second light-blocking plate 66 is placed on the seat upper side of the head rest 20. That is to say, in the stored state the first light-blocking plate 58, the second light-blocking plate 66, and the third light-blocking plate 32 can be placed in a position in which they do not get in the way of the occupant seated in the front seat 12. Furthermore, when the first light-blocking plate 58 and the second light-blocking plate 66 are placed in the use state, the third light-blocking plate 32 is placed in a position substantially opposing the front surface 52 of the head rest 20. That is, a space 70 surrounded by the first light-blocking plate 58, the second light-blocking plate 66, and the third light-blocking plate 32 is formed on the seat front side of the head rest 20. Additionally, in the use state of the sun visor 56 the head of the occupant is placed in this space 70. Consequently, because the head of the occupant seated in the front seat 12 is positioned on the seat front side of the head rest 20, the seat front side and both seat width direction sides of the head are covered by the first light-blocking plate 58, the second light-blocking plate 66, and the third light-blocking plate 32 that have a light-blocking property. For this reason, the light striking the occupant can be blocked in a wide range. Furthermore, because the base end portions 60 and 61 of the first light-blocking plate 58 and the second light-blocking plate 66 are attached to the head rest 20, when the orientation of the front seat 12 is changed the positions of the first light-blocking plate 58, the second light-blocking plate 66, and the third light-blocking plate 32 also concomitantly change. Consequently, even when the position of the front seat 12 is changed as a result of the front seat 12 being reclined or the front seat 12 being slid in the vehicle front and rear direction, the seat front side and both seat width direction sides of the head of the occupant can be concomitantly covered. That is to say, even when the front seat 12 is changed to various positions, the light striking the occupant can be blocked. Because of this, the comfort of the occupant with respect to sunlight can be improved regardless of the position of the front seat 12.

Furthermore, in the case of a self-driving vehicle, it is not necessary for the front seat 12 to face the vehicle forward direction while the self-driving vehicle is driving itself, so it is conceivable for the front seat 12 to face inward in the vehicle width direction so as to oppose another front seat 12 adjacent thereto or for the front seat 12 to face the vehicle rearward direction so as to oppose a rear seat 13 (see FIG. 5). In this case, the first light-blocking plate 58, the second light-blocking plate 66, and the third light-blocking plate 32 follow the change in the orientation of the front seat 12, so the seat front side and both seat width direction sides of the head of the occupant seated in the front seat 12 facing a direction other than the vehicle forward direction can be covered. Consequently, light can be blocked even when the occupant faces various directions. Because of this, the comfort of the occupant with respect to sunlight while the self-driving vehicle is driving itself can be improved.

Moreover, the third light-blocking plate 32 is attached via the second shaft S2 to the first light-blocking plate 58 and the second light-blocking plate 66, so in the use state a field of view in front of the occupant can be ensured by rotating the third light-blocking plate 32 so that it is substantially horizontal. Because of this, a field of view can be easily ensured in cases where it is necessary.

Furthermore, the first light-blocking plate 58 and the second light-blocking plate 66 are movable in the substantially seat up and down direction relative to the head rest 20, so the third light-blocking plate 32 that interconnects in the seat width direction the first light-blocking plate 58 and the second light-blocking plate 66 is also likewise movable in the substantially seat up and down direction. That is to say, the space 70 surrounded by the first light-blocking plate 58, the second light-blocking plate 66, and the third light-blocking plate 32 can be moved in the substantially seat up and down direction. Consequently, the position of the first light-blocking plate 58, the second light-blocking plate 66, and the third light-blocking plate 32 can be adjusted in accordance with the position of the eyes of the occupant and the position struck by light. Because of this, the comfort of the occupant with respect to sunlight can be improved regardless of the position of the front seat 12.

Third Embodiment

Next, a third embodiment of the vehicle sun visor pertaining to the present invention will be described using FIG. 5. It should be noted that constituent parts that are the same as those in the first embodiment are assigned the same numbers and description of those same constituent parts will be omitted.

The vehicle sun visor pertaining to the third embodiment has the same basic configuration as that of the first embodiment but is characterized in that an information display unit 76 is disposed on a third light-blocking plate 74 of a sun visor 72 serving as the vehicle sun visor.

That is, as shown in FIG. 5, the third light-blocking plate 74 is attached to the distal end portion 38 of the first light-blocking plate 28 and the distal end portion 39 of the second light-blocking plate 30. The third light-blocking plate 74 is configured by an opaque material that blocks light and is configured to include a front side light-blocking wall portion 78 formed in a substantially rectangular plate shape whose lengthwise direction coincides with the seat width direction and folded-back portions 82 disposed extending toward the seat rear side from both seat width direction end portions 80 of the front side light-blocking wall portion 78. That is to say, the third light-blocking plate 74 is formed in a substantially U-shape as seen in a vehicle plan view.

A display control unit 86 is disposed in a vehicle 84. The display control unit 86 is mainly configured by a computer equipped with a well-known CPU, ROM, and RAM (none of these are shown in FIG. 5). A GPS device, an on-board communication device, a navigation system, a vehicle speed sensor, and a TV tuner are connected by non-illustrated wires to the input side of the display control unit 86. The information display unit 76, which is configured by a liquid crystal display panel, for example, and is capable of displaying images, is connected by a wire 88 to the output side of the display control unit 86.

The information display unit 76 is attached to the seat front and rear direction rear surface of the third light-blocking plate 74. Consequently, when the sun visor 72 is in the use state, the information display unit 76 is placed on the vehicle front side of the head of the occupant seated in the front seat 12. Because of this, the occupant can view information displayed on the information display unit 76.

(Action and Effects of Third Embodiment)

Next, the action and effects of the present embodiment will be described.

In the present embodiment, like in the first embodiment, as shown in FIG. 1, when the first light-blocking plate 28 and the second light-blocking plate 30 are placed in the stored state, the third light-blocking plate 74 that interconnects in the seat width direction the distal end portion 38 of the first light-blocking plate 28 and the distal end portion 39 of the second light-blocking plate 30 is placed on the seat upper side of the head rest 20. That is to say, in the stored state the first light-blocking plate 28, the second light-blocking plate 30, and the third light-blocking plate 74 can be placed in a position in which they do not get in the way of the occupant seated in the front seat 12. Furthermore, when the first light-blocking plate 28 and the second light-blocking plate 30 are placed in the use state, the third light-blocking plate 74 is placed in a position substantially opposing the front surface 52 of the head rest 20. That is, the space 54 surrounded by the first light-blocking plate 28, the second light-blocking plate 30, and the third light-blocking plate 74 is formed on the seat front side of the head rest 20. Additionally, in the use state of the sun visor 72 the head of the occupant is placed in this space 54. Consequently, because the head of the occupant seated in the front seat 12 is positioned on the seat front side of the head rest 20, the seat front side and both seat width direction sides of the head are covered by the first light-blocking plate 28, the second light-blocking plate 30, and the third light-blocking plate 74 that have a light-blocking property. For this reason, the light striking the occupant can be blocked in a wide range. Furthermore, because the base end portions 34 and 35 of the first light-blocking plate 28 and the second light-blocking plate 30 are attached to the head rest 20, when the orientation of the front seat 12 is changed the positions of the first light-blocking plate 28, the second light-blocking plate 30, and the third light-blocking plate 74 also concomitantly change. Consequently, even when the position of the front seat 12 is changed as a result of the front seat 12 being reclined or the front seat 12 being slid in the vehicle front and rear direction, the seat front side and both seat width direction sides of the head of the occupant can be concomitantly covered. That is to say, even when the front seat 12 is changed to various positions, the light striking the occupant can be blocked. Because of this, the comfort of the occupant with respect to sunlight can be improved regardless of the position of the front seat 12.

Furthermore, in the case of a self-driving vehicle, it is not necessary for the front seat 12 to face the vehicle forward direction while the self-driving vehicle is driving itself, so it is conceivable for the front seat 12 to face inward in the vehicle width direction so as to oppose another front seat 12 adjacent thereto or for the front seat 12 to face the vehicle rearward direction so as to oppose a rear seat 13 (see FIG. 5). In this case, the first light-blocking plate 28, the second light-blocking plate 30, and the third light-blocking plate 74 follow the change in the orientation of the front seat 12, so the seat front side and both seat width direction sides of the head of the occupant seated in the front seat 12 facing a direction other than the vehicle forward direction can be covered. Consequently, light can be blocked even when the occupant faces various directions. Because of this, the comfort of the occupant with respect to sunlight while the self-driving vehicle is driving itself can be improved.

Moreover, the third light-blocking plate 74 is attached via the second shaft S2 to the first light-blocking plate 28 and the second light-blocking plate 30, so in the use state a field of view in front of the occupant can be ensured by rotating the third light-blocking plate 74 so that it is substantially horizontal. Because of this, a field of view can be easily ensured in cases where it is necessary.

Furthermore, as shown in FIG. 5, when the sun visor 72 is placed in the use state, information can be displayed to the occupant seated in the front seat 12 because the information display unit 76 is disposed on the third light-blocking plate 74 opposing the head rest 20. Specifically, the vehicle speed and position information input to the display control unit 86 are output to the information display unit 76, and these pieces of predetermined information are displayed on the information display unit 76, so the occupant can view information about the state of travel. Furthermore, signals from the TV tuner input to the display control unit 86 are output from the display control unit 86 to the information display unit 76, and the signals are displayed on the information display unit 76, so the occupant can watch TV. Consequently, the occupant can check information and watch TV while the sun visor 72 is in the use state. Because of this, the user-friendliness of the sun visor 72 can be improved.

It should be noted that although in the present embodiment the information display unit 76 is given a configuration in which it is attached to the vehicle rear surface of the third light-blocking plate 74, the information display unit 76 is not limited to this and may also be given a configuration in which it is built into the third light-blocking plate 74.

Furthermore, in the first embodiment, the second embodiment, and the third embodiment, the first light-blocking plates 28 and 58 and the second light-blocking plates 30 and 66 are configured by an opaque material, but the first light-blocking plates 28 and 58 and the second light-blocking plates 30 and 66 are not limited to this and may also be configured by a translucent material that can block light like the third light-blocking plate 32. Because of this, the occupant can view the lateral directions of the occupant even when the sun visor 26 is in the use state.

Embodiments of the present invention have been described above, but the present invention is not limited to what is described above and can of course be implemented in a variety of ways other than those described above without departing from the spirit thereof.

What is claimed is:

1. A combination, comprising:
    a vehicle seat on a self-driving vehicle, the vehicle seat being capable of changing orientation during self-driving of the self-driving vehicle; and
    a vehicle sun visor including:
        a first light-blocking plate that (i) is constituted by a material having a light-blocking property, (ii) has a plate shape, (iii) has a base end portion attached to a vehicle inside surface of a head rest of the vehicle seat via a first shaft whose axial direction coincides with a width direction of the vehicle seat, and (iv) is capable of assuming a stored state, in which the first light-blocking plate is positioned so that a lengthwise direction of the first light-blocking plate lies along up and down directions of the vehicle seat about the first shaft, and a use state, in which the first light-blocking plate is positioned so that the lengthwise direction lies along front and rear directions of the vehicle seat about the first shaft;
        a second light-blocking plate that (i) is constituted by a material having a light-blocking property, (ii) has a plate shape, (iii) has a base end portion attached to a vehicle outside surface of the head rest via the first shaft, and (iv) is capable of assuming the stored state and the use state; and a third light-blocking plate that (i) is constituted by a material having a light-blocking property, (ii) has a plate shape, and (iii) is disposed directly adjacent a distal end portion of the first light-blocking plate and a distal end portion of the second light-blocking plate, wherein when assuming the use state, orientation of the vehicle sun visor changes concomitantly with change in orientation of the vehicle seat, and wherein the third light-blocking plate is directly attached to the first light-blocking plate and the second light-blocking plate via a second shaft whose axial direction coincides with the width direction of the vehicle seat, the third light-blocking plate being rotatable relative to the first light-blocking plate and the second light-blocking plate.

2. The combination according to claim 1, wherein the first light-blocking plate, the second light-blocking plate, and the third light-blocking plate are movable substantially in the up and down directions of the vehicle seat relative to the head rest.

3. The combination according to claim 1, wherein an information display unit capable of displaying predetermined information is disposed on or in the third light-blocking plate.

* * * * *